United States Patent
Kohn et al.

[15] 3,686,398
[45] Aug. 22, 1972

[54] 10,9-BOROXAROPHENANTHRENE AS FUNGICIDES

[72] Inventors: Gustave K. Kohn, Berkeley, Calif.; Randolph J. McMurtry, Denver, Colo.

[73] Assignee: Research Company Chevron, San Francisco, Calif.

[22] Filed: July 20, 1970

[21] Appl. No.: 56,693

[52] U.S. Cl. ................................................424/185
[51] Int. Cl. ..............................................A01n 9/00
[58] Field of Search ......................424/185; 260/999

[56] References Cited

UNITED STATES PATENTS 2,975,042   3/1961   Summers......................44/72
3,320,165   5/1967   Bridger.....................252/49.6

Primary Examiner—Albert T. Meyers
Assistant Examiner—Vincent D. Turner
Attorney—A. L. Snow, F. E. Johnston, G. F. Magdeburger and Dix A. Newell

[57] ABSTRACT

Control of fungi by using a composition comprising a compound of the formula

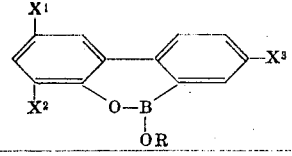

wherein $X^1$, $X^2$ and $X^3$ are hydrogen, halogen of atomic number 9 to 35 (fluorine, chlorine or bromine) or hydrocarbon carboxyacyl of one to five carbon atoms and R is hydrogen, aliphatic hydrocarbon group of one to five carbon atoms or aliphatic hydrocarbon group of 1 to 6 carbon atoms substituted one to four hydroxy groups or halogens of atomic number 17 to 35.

6 Claims, No Drawings

10,9-BOROXAROPHENANTHRENE AS FUNGICIDES

BACKGROUND OF THE INVENTION

1. Field

The present invention is concerned with the control of fungi by the use of 10,9-boroxarophenanthrenes.

2. Prior Art

Certain of the compounds disclosed herein are known in the prior art. Thus, for example, 65. 10-hydroxy-10,9-boroxarophenanthrene and derivatives thereof are disclosed in the Journal of American Chem. Society, Volume 89, page 2408 (1967); Chem. Rev., page 227 (1962); and Journal Chem. Soc., page 1344 (1960). Also from Industrial and Engineering Chem., Volume 5 September 1966), 10-hydroxy-10,9-boroxarophenanthrene was known as being useful as an antioxidant for hydrocarbon oil. Also, 10-methyl-10,9-borazarophenanthrene is disclosed in the prior art, e.g. in Organic Synthesis, Volume 46, page 5.

SUMMARY OF THE INVENTION

It has now been discovered that certain boroxarophenanthrenes as disclosed herein are highly useful in controlling a variety of fungi. The boroxarophenanthrenes are applied in fungicidal amounts directly to the fungi or to the environments which are subject to fungus attack.

DESCRIPTION OF THE INVENTION

The present invention is directed to the method for controlling fungi by applying in a fungicidal amount to fungi or hosts which are subject to fungus attack a compound of the formula

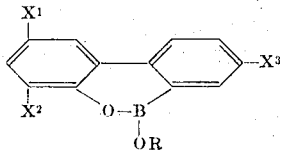

wherein $X^1$, $X^2$ and $X^3$ are hydrogen, halogen of atomic number 9 to 35 (fluorine, chlorine or bromine) or hydrocarbon carboxyacyl of one to five carbon atoms and R is hydrogen, aliphatic hydrocarbon group of one to six carbon atoms or aliphatic hydrocarbon group of one to six carbon atoms substituted with one to four hydroxy groups or halogens of atomic number 17 to 35. The X's may be the same or different.

Preferably, $X^1$, $X^2$ and $X^3$ are hydrogen, halogen of atomic number 17 to 35 (chlorine and bromine) or alkanoyl of one to five carbon atoms.

Preferred compounds are those in which $X^1$, $X^2$ and $X^3$ are hydrogen, chlorine, bromine or acetyl. Generally desirable compounds are those wherein $X^1$ and $X^2$ are the same, for example, bromine, chlorine or acetyl and $X^3$ is hydrogen. Other preferred compounds are those wherein $X^1$, $X^2$ and $X^3$ are the same, e.g., hydrogen, chlorine or bromine.

R in the above formula is preferably hydrogen, alkyl of one to four carbon atoms, alkenyl of two to four carbon atoms, alkynyl of two to four carbon atoms; alkyl of one to four carbon atoms substituted with one to four hydroxy groups or halogens of atomic number 17 to 35, alkenyl of two to four carbon atoms substituted with one to four hydroxy groups or halogens of atomic number 17 to 35 or alkynyl of two to four carbon atoms substituted with one to four hydroxy groups or halogens of atomic number 17 to 35. Preferably the number of hydroxy groups or halogen substituents will be from one to two and preferably only 1. Still more preferably, R will be hydrogen, alkyl of one to two carbon atoms optionally substituted with 0 to 2 hydroxy groups or halogen atoms of atomic number 17 to 35, alkenyl of two to three carbon atoms optionally substituted with 0 to 2 hydroxy groups or halogen atoms of atomic number 17 to 35 or alkynyl of two to three carbon atoms optionally substituted with 0 to 2 hydroxy groups or halogen atoms of atomic number 17 to 35.

Representative groups for $X^1$, $X^2$ and $X^3$ are hydrogen, fluorine, chlorine, bromine, formyl, acetyl, propionyl, butyryl and valeryl.

Representative R groups include hydrogen, methyl, ethyl, propyl, isopropyl, butyl, isobutyl, pentyl, hexyl, cyclopentyl, cyclohexyl, allyl, vinyl, butenyl, propargyl, cyclohexenyl, chloromethyl, bromomethyl, fluoromethyl, dichloromethyl, trichloromethyl, 2-hydroxyethyl, 2-hydroxypropyl, 2,2-dichloroethyl, 1,2-dibromoethyl, 2,3-dichloropropyl, etc.

Representative compounds for use in the present invention include 10-hydroxy-10,9-boroxarophenanthrene, 10-methoxy-10,9-boroxarophenanthrene, 10-ethoxy-10,9-boroxarophenanthrene, 10-propoxy-10,9-boroxarophenanthrene, 10-butoxy-10,9-boroxarophenanthrene, 10-(2-propynoxy)-10,9-boroxarophenanthrene, 10-(2-hydroxy ethoxy)-10,9-boroxarophenanthrene, 10-(2-chloroethoxy)-10,9-boroxarophenanthrene, 10-(2,3-chloropropoxy)-10,9-boroxarophenan-threne, 2-bromo-10-hydroxy-10,9-boroxarophenanthrene, 2-chloro-10-hydroxy-10,9-boroxarophenanthrene, 6-chloro-10-hydroxy-10,9-boroxarophenanthrene, 8-chloro-10-hydroxy-10,9-boroxarophenanthrene, 6,8-dichloro-10-hydroxy-10,9-boroxarophenanthrene, 2,6,8-trichloro-10-hydroxy-10,9-boroxarophenanthrene, 2,6,8-tribromo-10-hydroxy-10,9-boroxarophenanthrene, 2,6,8-tribromo-10-methoxy-10,9-boroxarophenanthrene, 6,8-difluoro-10-methoxy-10,9-boroxarophenanthrene, 6,8-formyl-10-hydroxy-10,9-boroxarophenanthrene, 2,6,8-formyl-10-(2-chloroethoxy)-10,9-boroxarophenanthrene, 6,8-acetyl-10-methoxy-10,9-boroxarophenanthrene, 2,6,8-acetyl-10-hydroxy-10,9-boroxarophenanthrene, etc.

Many of the compounds which find use in the present invention are known in the prior art. Thus, 10,9-boroxarophenanthrenes as well as derivatives thereof and the preparation of said compounds are disclosed in Journal Chem. Soc., page 1344 (1960) which is incorporated herein by reference thereto.

Briefly, to prepare 10,9-boroxarophenanthrene, boron trichloride is reacted with 2-hydroxybiphenyl in an inert solvent, e.g. methylene chloride. The reaction temperature may be from −80° C to as high as 50° C. Boron trichloride is generally present in excess. The reaction is accompanied by the evolution of HCl and is generally run from ¼ hour to 6 hours. At this stage, it may be desirable to remove excess boron trichloride and solvent and then add aluminum chloride in benzene or other light petroleum solvent. Alternately the aluminum chloride may be added directly to the reaction mixture without removal of excess boron trichloride and solvent. The addition of aluminum chloride is effective in causing ring closure. The temperature at this stage of the preparation may be from 0° C to reflux temperature and the time will generally range from ¼ hour to 6 hours.

The 10-chloro-10,9-boroxarophenanthrene prepared above may be converted to 10-hydroxy-10,9-boroxarophenanthrene by the addition of an excess of water to hydrolyze the 10-chloro compound. Following hydrolysis the solvent may be removed, as for example, by distillation and solid 10-hydroxy-10,9-boroxarophenanthrene recovered. Further purification of the 10-hydroxy-10,9-boroxarophenanthrene may be accomplished by recrystallization from suitable solvents such as benzene.

To convert 10-hydroxy-10,9-boroxarophenanthrene to compounds having a different R group within the scope of this invention, 10-hydroxy-10,9-boroxarophenanthrene may be reacted with a suitable alcohol according to the following equation:

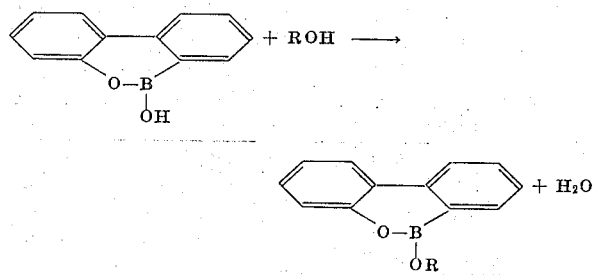

wherein R is as defined above (with the exception, of course, that R will not be an H for the purposes of this reaction). The reaction can be easily carried out using preferably an excess of the ROH, as for example, from one to four moles of alcohol per mole of 10-hydroxy-10,9-boroxarophenanthrene. Reaction temperature will be preferably from $-80°$ C. to 50° C. and the duration of the reaction will usually range from 0.5 to 24 hours. The reaction is preferably carried out in the presence of a solvent such as methylene chloride or other solubilizing inert solvent. Removal of the solvent permits recovery of the desired product.

Compounds of which $X^1$, $X^2$ and $X^3$ are other than all hydrogen can be prepared by reacting 10-hydroxy-10,9-boroxarophenanthrene or esters thereof with halogen in glacial acetic acid. The reaction temperature will be from $-80°$ C. to 100° C. with reaction time being from ¼ hour to 10 hours. Generally the halogen solution is added dropwise. To produce the 6,8-dihalo compound, 2 moles of halogen per mole of the boroxarophenanthrene are preferred. To produce the trihalogen compound, 3 moles or more of halogen per mole of boroxarophenanthrene are generally required. Following addition of halogen to the boroxarophenanthrene, water can be added to precipitate the crude halo compound. Crystallization from aqueous acetic acid can be used to purify the product.

Compounds where $X^1$, $X^2$ and $X^3$ are hydrocarbon carboxyacyl groups may be prepared by reacting the 10-hydroxy-10,9-boroxarophenanthrene with a hydrocarbon carboxyacyl halide, e.g. acetyl chloride at a temperature of from $-50°$ C. to 50° C. Generally the hydrocarbon carboxyacyl halide will be present in excess, preferably from 1 to 6 moles of the hydrocarbon carboxyacyl per mole of the boroxarophenanthrene. The duration of the reaction will run from ¼ hour to 24 hours or more. The reaction is desirably accomplished in the presence of a catalyst, for example, aluminum chloride and a solvent such as carbon disulfide. Besides aluminum trichloride, other active Friedel Craft catalysts may be used. Other solvents may include ethylene dichloride and methylene chloride.

After the reaction is completed, the mixture may be poured into water and the desired product recovered from the water layer. Additional product may be recovered from the organic solvent layer.

Alternatively, it is possible to prepare appropriate substituted 10-hydroxy-10,9-boroxarophenanthrene or esters thereof by using a suitable substituted 2-hydroxybiphenyl in the reaction with the boron trichloride and aluminum chloride as set out above.

The preparation of the suitable boroxarophenanthrene used in the present invention may be more fully understood by reference to the following examples.

EXAMPLE 1

Preparation of 10-hydroxy-10,9-boroxarophenanthrene.

108 g. of boron trichloride was introduced through a fritted gas inlet into a stirred solution of 160 g. of 2-hydroxy-biphenyl and 1.5 liters of methylene chloride. There was a steady evolution of HCl. The solution was stirred for an additional 4 hours at room temperature and then 1.5 g. of aluminum chloride added. A vigorous evolution of HCl was observed following the aluminum chloride addition. After stirring at room temperature for 2 hours the flask was warmed gently for 1 hour then heated to reflux for an additional 2 hours. 400 cc of water were added cautiously. Filtration of the white solid yielded 108 g. of 10-hydroxy-10,9-boroxarophenanthrene. The water layer and methylene chloride layers were separated and the methylene chloride layer stripped to yield an additional 38.7 g. of 10-hydroxy-10,9-boroxarophenanthrene. Chemical analysis gave the following:

|  | Calculated | Found |
|---|---|---|
| Carbon % | 73.5 | 77.0 |
| Hydrogen % | 4.6 | 4.26 |
| Melting Point — 201°–3° C. | | |

EXAMPLE 2

Preparation of 2,6,8-tribromo-10-hydroxy-10,9-boroxaro-phenanthrene.

One liter of glacial acetic acid and 100 g. of 10-hydroxy-10,9-boroxarophenanthrene were placed in a 3-liter flask fitted with a mechanical stirrer, addition funnel and cold water condenser. Temperature control was provided by a heated water bath. 300 g. of bromine were added slowly in a dropwise manner, with reaction temperature being maintained at approximately 50° C. Following addition of the bromine the flask was heated to about 95° C. for an additional 6 hours. After cooling the crude slurry was poured into 2 liters of ice water. The solid was filtered and washed with two 250 cc portions of ice water. The cake was dissolved in 1 liter of diethyl ether and washed with aqueous sodium bicarbonate solution. The organic layer was washed with 250 cc of water and dried over anhydrous magnesium sulfate. After stripping the ether, the solid residue was dissolved in 500 cc of hot benzene. Approximately 400 cc of hexane was added and the solution allowed to stand for several hours. Filtration of a mushy solid yielded 152 g. of 2,6,8-tribromo-10-hydroxy-10,9-boroxarophenanthrene. Chemical analysis showed the following:

|   | Calculated | Found |
|---|---|---|
| Bromine % | 55.3 | 53.22 |

Melting Point — >290° C.

Other compounds useful in the present invention were prepared by the general methods of Example 1 and Example 2 above. Table I gives the result.

TABLE I.—ELEMENTAL ANALYSIS PERCENT BY WEIGHT

| Compound | Halogen Calc. | Halogen Found | Melting point, ° C. |
|---|---|---|---|
| 2,6,8-tribromo-10-methoxy-10,9-boroxarophenanthrene | 53.6 | 52.4 | 138–140 |
| 6,8-dichloro-10-hydroxy-10,9-boroxarophenanthrene | 26.8 | 33.0 | 200–210 |
| 6,8-dibromo-10-hydroxy-10,9-boroxarophenanthrene | 45.1 | 45.45 | 200–210 |
| 10-(2-chloroethoxy)-10,9-boroxarophenanthrene | 13.7 | 13.0 | 86–88 |
| 6,8-dibromo-10-(2-hydroxyethoxy)-10,9-boroxarophenanthrene | 39.5 | 34.75 | 200–207 |
| 6,8-dibromo-10-(2-propynoxy)-10,9-boroxarophenanthrene | 40.0 | 38.6 | 217–221 |
| 6,8-dibromo-10-methoxy-10,9-boroxarophenanthrene | 43.4 | 39.9 | 110–125 |
| 6,8-diacetyl-10-hydroxy-10,9-boroxarophenanthrene [2] | | | 137–143 |
| 6 or 8-bromo-10-hydroxy-10,9-boroxarophenanthrene [1] | 29.3 | 32.5 | 225–238 |

[1] A mixture of the 6-bromo, 8-bromo compounds; predominant amount is the 6-bromo.
[2] Analysis showed: Carbon: Calc. 68.6%; Found 67.7%. Hydrogen: Calc. 4.64%; Found 5.35%.

The present invention is directed to the use of the boroxarophenanthrenes as fungicides. When used as fungicides the boroxarophenanthrenes of this invention will be formulated and applied in fungicidal amounts by conventional art methods to fungi or hosts which are subject to fungus attack, especially vegetative hosts such as plants, plant seeds, etc. The amount used will, of course, depend upon several factors such as the host, the type of fungus, the particular boroxarophenanthrene, etc. The amount generally will range from 2 to 90 percent. The boroxarophenanthrenes may be combined with inert liquids or solid carriers as powders, solutions, dispersions, etc. for such use.

The boroxarophenanthrenes of this invention will generally be admixed with biologically inert liquids or solids in an amount of from about 0.005 to 95 weight percent. Higher or lower amounts can be used to advantage. Preferably from 1 to 50 weight percent of the composition will be the boroxarophenanthrene. Typical of the liquid carrier which may be admixed with the boroxarophenanthrenes of this invention include, in addition to acetone, such liquids as water, kerosene, xylene, alcohols, alkylated naphthylene and glycols. Typical solids which may be incorporated with the boroxarophenanthrenes include the natural clays, such as kaolin clays, diatomaceous earth, synthetic fine silica, talc, pyrophyllite, etc.

Fungicidal formulations may also contain stabilizers, spreading agents, sticking agents, fillers, other compatible pesticides and the like.

To exhibit the apparent fungicidal activity of the compounds against a variety of fungi, the following tests were made.

EXAMPLE A

A number of the inventive compounds were evaluated for fungicidal effectiveness by means of the mycelial drop test. This test is designed to measure the fungitoxic activity of fungicidal chemicals in terms of their degree of inhibition on mycelium growth. Each compound to be tested was dissolved in acetone to 500 ppm concentration. Paper discs previously inoculated with equal amounts of particular fungus mycelium were placed on potato dextrose agar medium. The paper discs were treated by applying a precise and equal volume of each of these fungicidal solutions to the center. Following treatment with the fungitoxic chemical, the discs were incubated along with inoculated but untreated control discs at ambient temperatures until such time that these untreated control discs were filled to a certain level with mycelial growth away from the edge of the disc in treated and untreated samples. From this comparison a percent inhibition of growth area was determined. The results of these tests for various compounds of this invention on the particular fungus mycelium are indicated in Table II.

TABLE II

| Compound | Percent control | | |
|---|---|---|---|
| | Helminth [1] | Fusarium [2] | Rhizoctonia [3] |
| 10-hydroxy-10,9-boroxarophenanthrene | 100 | 90 | 100 |
| 2,6,8-tribromo-10-methoxy-10,9-boroxarophenanthrene | | | 90 |
| 6,8-dichloro-10-hydroxy-10,9-boroxarophenanthrene | 97 | 61 | 90 |
| 2,6,8-tribromo-10-hydroxy-10,9-boroxarophenanthrene | 100 | 61 | 100 |
| 6,8-dibromo-10-hydroxy-10,9-boroxarophenanthrene | 85 | 78 | 78 |
| 10-(2-chloroethoxy)-10,9-boroxarophenanthrene | 98 | 61 | 51 |
| 6,8-dibromo-10-(2-hydroxyethoxy)-10,9-boroxarophenanthrene | 93 | | 90 |
| 6,8-dibromo-10-(2-propynoxy)-10,9-boroxarophenanthrene | 90 | | 85 |
| 6,8-dibromo-10-methoxy-10,9-boroxarophenanthrene | 94 | 90 | 98 |
| 6,8-diacetyl-10-hydroxy-10,9-boroxarophenanthrene | | 70 | |
| 6 or 8-bromo-10-hydroxy-10,9-boroxarophenanthrene | 96 | | 94 |

[1] *Helminthosporium sativum.*
[2] *Fusarium oxysporum.*
[3] *Rhizoctonia solani.*

EXAMPLE B

A number of the compounds were also tested for effectiveness against spores by means of a variation of "The Standard Spore Slide-Germination Method for Determining Fungicidal Activity," described in the *American Phytopathological Society Journal*, Volume 33, pages 627–632 (1943). The method is designed to measure the fungitoxic activity of fungicidal chemicals, their activity being expressed in terms of percent inhibition of germination of fungus spores. Each compound toxicant to be tested was dissolved in acetone to a concentration of 100 ppm. These solutions were then pipetted into the wells of depression slides and allowed to dry. The wells were filled with a spore suspension of the specified test organism. A 10-fold greater volume of suspension was used than that used to apply the toxicant so that the slide concentration of toxicant was 10 ppm. The spores were then incubated in a moist chamber overnight. A group of 100 spores was examined and the number of spores germinated and not germinated was counted and recorded to show the biological activity in terms of the percent germination inhibition. Table III reports the results of this testing.

TABLE III

% Control

| Compound | Monolinia[1] |
|---|---|
| 10-hydroxy-10,9-boroxarophenanthrene | 100 |
| 10-(2-chloroethoxy)-10,9-boroxarophenanthrene | 100 |
| 6,8-dibromo-10-(2-hydroxyethoxy)-10,9-boroxarophenanthrene | 100 |

| | |
|---|---|
| 6,8-dibromo-10-(2-propynoxy)-10,9-boroxarophenanthrene | 97 |
| 6,8-dibromo-10-methoxy-10,9-boroxarophenanthrene | 100 |
| 6,8-diacetyl-10-hydroxy-10,9-boroxarophenanthrene | 85 |
| 6 or 8-bromo-10-hydroxy-10,9-boroxarophenanthrene | 100 |

(1)*Monolinia fructicola*

EXAMPLE C

Compounds of the present invention were also tested to determine their fungicidal value in foliar spray applications against leaf blights and leaf rust.

The leaf blight tests were conducted using celery (Utah) plants 11 weeks old. The celery late blight organism was *Septoria apii*. The celery plants were sprayed with solutions of the candidate toxicant mixed with acetone, water and a nonionic emulsifier. The plants were then inoculated with the organism and placed in an environmental chamber and incubated at 66°–68° F. in 100 percent relative humidity for an extended period of time (approximately 48 hours). Following the incubation the plants were allowed to dry and then were maintained at a 60–80 percent relative humidity for approximately 14 days. The percent disease control provided by a given candidate toxicant is based on the percent disease reduction relative to untreated check plants. The results are reported in Table IV.

The leaf rust test was made using pinto beans. The pathogen was *uronyces phaseoli tipica*. The pinto bean plants were sprayed with a solution of the candidate toxicant at a certain concentration in acetone-water mixture containing a nonionic emulsifier. The thus treated plants were inoculated thereafter with the pathogen and then incubated in an environmental chamber for approximately 20 hours at 100 percent relative humidity and a temperature of 68°–70° F. The plants were then removed from the chamber allowed to dry and then maintained in a greenhouse at a 60–80 percent relative humidity. The rate of infection on the leaves was made after about 14 days. The percent disease control provided by a given candidate toxicant was based on the disease reduction relative to untreated check plants. The results are reported in Table IV.

TABLE IV

| Compound | Conc., p.p.m. | Percent control Bean rust | Percent control Celery late blight |
|---|---|---|---|
| 2,6,8-tribromo-10-methoxy-10,9-boroxarophenanthrene | 100 | 98 | 100 |
| | 40 | 94 | 85 |
| | 16 | 91 | 66 |
| 2,6,8-tribromo-10-hydroxy-10,9-boroxarophenanthrene | 100 | 99 | 99 |
| | 40 | 95 | 92 |
| | 16 | 89 | 62 |
| 6,8-dibromo-10-hydroxy-10,9-boroxarophenanthrene | 100 | 88 | |
| | 40 | 81 | |
| | 16 | 77 | |
| 6,8-dibromo-10-(2-hydroxyethoxy)-10,9-boroxarophenanthrene | 100 | 96 | a95 |
| | 40 | 90 | 92 |
| | 16 | 89 | 91 |
| 6,8-dibromo-10-(2-propynoxy)-10,9-boroxarophenathrene | 100 | 92 | b91 |
| | 40 | 90 | 91 |
| | 16 | 76 | 73 |
| 6,8-dibromo-10-methoxy-10,9-boroxarophenanthrene | 100 | 94 | |
| | 40 | 86 | |
| | 16 | 67 | |

TABLE IV—Continued

| Compound | Conc., p.p.m. | Percent control Bean rust | Percent control Celery late blight |
|---|---|---|---|
| 6,8-diacetyl-10-hydroxy-10,9-boroxarophenanthrene | 100 | 90 | |
| | 40 | 61 | |
| 6 or 8-bromo-hydroxy-10,9-boroxarophenanthrene | 100 | 98 | |
| | 40 | 86 | |
| | 16 | 64 | | a 22 days between incubation and reading of percent control. 1:1 dimethylfuran:acetone used as well as water and emulsifier.
b 22 days between incubation and reading of percent control.

As will be evident to those skilled in the art, various modifications of this invention can be made or followed in the light of the foregoing disclosure and discussion without departing from the spirit or scope of the disclosure or from the scope of the following claims.

We claim:

1. A method for controlling fungi which comprises contacting said fungi or vegetative hosts which are subject to fungus attack with a fungicidal amount of a compound of the formula

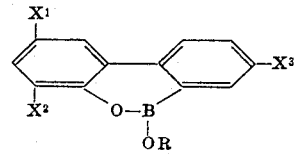

wherein $X^1$, $X^2$ and $X^3$ are hydrogen, halogen of atomic number 9 to 35 or alkanoyl of one to five carbon atoms and R is hydrogen, alkyl of one to four carbon atoms, alkynyl of two to four carbon atoms, alkyl of one to four carbon atoms substituted with one to four hydroxy groups or halogen of atomic number 17 to 35.

2. The method of claim 1 wherein $X^1$, $X^2$ and $X^3$ are hydrogen, halogen of atomic number 17 to 35 or alkanoyl of one to five carbon atoms.

3. The method of claim 1 wherein $X^1$, $X^2$ and $X^3$ are hydrogen, chlorine, bromine or acetyl and R is hydrogen, alkyl of one to two carbon atoms substituted with 0 to 2 hydroxy groups or halogen atoms of atomic number 17 to 35, or alkynyl of two to three carbon atoms.

4. The method of claim 1 wherein $X^1$ and $X^2$ are the same and $X^3$ is hydrogen.

5. The method of claim 1 wherein $X^1$, $X^2$ and $X^3$ are the same.

6. A method for controlling fungi which comprises contacting said fungi or vegetative hosts which are subject to fungus attack with a fungicidal amount of a compound of the formula

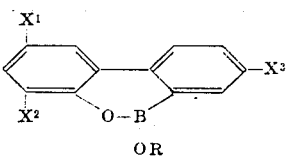

wherein $X^1$ and $X^2$ are the same and are bromine, chlorine or alkanoyl of one to five carbon atoms, $X^3$ is hydrogen, and R is hydrogen, alkyl of one to four carbon atoms, alkynyl of two to four carbon atoms, alkyl of one to four carbon atoms substituted with one to four hydroxy groups or halogen of atomic number 17 to 35.

* * * * *